H. K. MacMORAN.
EGG BEATER.
APPLICATION FILED JULY 27, 1916.

1,240,355.

Patented Sept. 18, 1917.

Inventor
Henrietta K. MacMoran
By Henry L. Reynolds,
Attorney

UNITED STATES PATENT OFFICE.

HENRIETTA K. MacMORAN, OF BURLINGTON, WASHINGTON.

EGG-BEATER.

1,240,355.    Specification of Letters Patent.    Patented Sept. 18, 1917.

Application filed July 27, 1916. Serial No. 111,553.

*To all whom it may concern:*

Be it known that I, HENRIETTA K. MAC-MORAN, a citizen of the United States, and resident of Burlington, Skagit county, State of Washington, have invented certain new and useful Improvements in Egg-Beaters, of which the following is a specification.

My invention relates to egg beaters, and has for its principal object the production of a strong and substantial egg beater, which will efficiently perform the desired function, and which cannot catch in the clothes of the operator.

My invention comprises the novel parts and combinations of parts which are shown in the drawings, and which will be hereinafter described in the specification, and defined by the claim terminating the same.

I have shown my invention, in the accompanying drawings, in the form which is now preferred by me.

Figure 1:
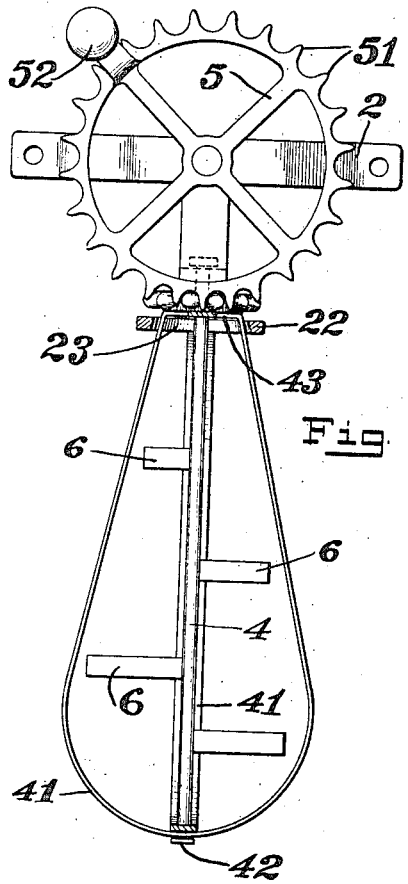
Figure 1 is a front elevation of my egg beater.
Figure 2:
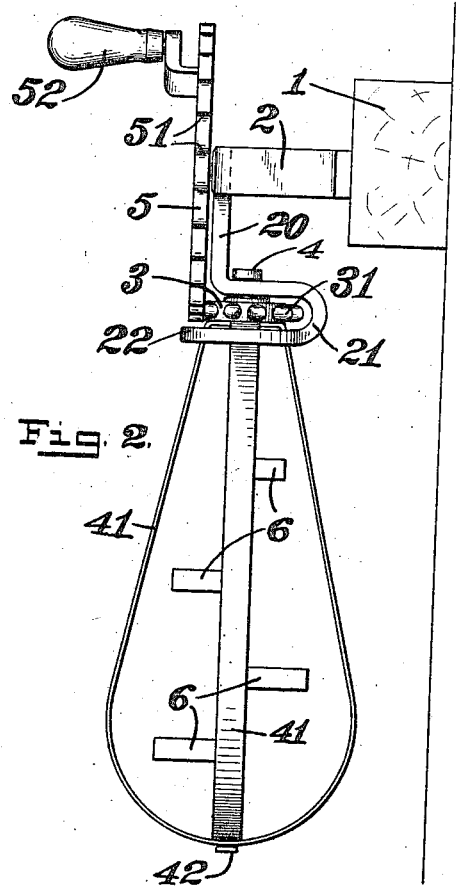
Fig. 2 is a side elevation.

My improved egg beater is adapted to be supported from a wall or shelf 1, by means of a bracket 2, as shown in Fig. 2. Formed integral with the bracket 2 is a downward extension 20, which is bent at its lower end to form a U-shaped horizontally-extending member 21. The lower arm 22 of this U-shaped member 21 is preferably ring-shaped, and has a hole 23 extending therethrough.

Figure 3:
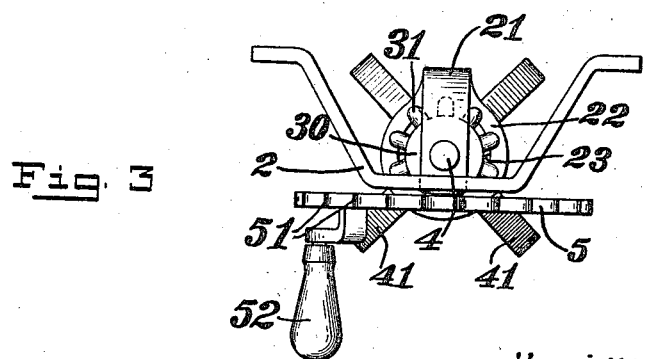
Fig. 3 is a plan view.

Between the arms of the U-shaped member 21 is placed a pin wheel 3. This wheel is secured upon the upper end of a vertical shaft 4, and turns in a horizontal plane. Wheel 3 is composed of a disk 30, having pins 31 radiating therefrom. The outer ends of these pins 31 are rounded, to lessen the friction, and to lessen the possibility of their catching in the garments of the operator, or in the dish-towel when they are dried. As a further means of avoiding their catching, the ends of the pins 31 are within the outer periphery of the rounded arm 22, as shown in Fig. 3.

Journaled directly upon the bracket 2 is a larger gear wheel 5. This gear wheel has teeth 51, meshing with the pins 31 on the pin wheel 3. The ends of the teeth 51 are smoothly rounded off, so that they will not catch in the dish-cloth or in the operator's clothes. A handle 52 may be mounted upon the wheel 5, or it may be turned in any other suitable manner.

The upper end of the shaft 4 is journaled in the upper arm of the U-shaped member 21. A loop or loops 41 formed of sheet metal, or of any suitable material, are secured upon the shaft 4, and turn therewith. The lower end of the shaft passes through the lowest point of the loops and secures them together, if there is more than one loop, as shown at 42. The upper end of these loops 41 passes through the hole 23 in the lower arm 22 of the U-shaped member 21. These upper ends may be bent to contact with the pin-wheel 3, as shown at 43, where they may be secured, as by welding or riveting.

Upon the shaft 4 are secured paddles 6. These paddles are preferably rectangular in shape, and extend outward from the shaft to present their flat surface to the egg which is being beaten. As they turn with the shaft, they churn up the egg which is within the loops, and throw it outward by centrifugal force, to where it will be acted upon by the loops 41. This prevents an accumulation of unchurned matter within the loops, as is the case with egg-beaters of the ordinary type.

What I claim as my invention:

In an egg-beater, in combination, a shaft, a horizontal pinion secured upon said shaft, a plurality of loops having their upper ends bent to contact with the downwardly-directed face of the pinion and being secured thereto, a bracket having an integral downward extension and a laterally offset U-shaped member, said pinion lying between the arms of the U-shaped member, and said shaft being journaled only in the upper arm of said U-shaped member, the lower arm of the U-shaped member being expanded to form a ring and closely embracing the upward extensions of said loops immediately below their connection with the pinion, said ring being of greater diameter than the outside diameter of the pinion, and a gear wheel journaled in said bracket and meshing with said pinion.

Signed at Burlington, Washington, this 18th day of July, 1916.

HENRIETTA K. MacMORAN.

Copies of this patent may be obtained for five cents each, by addressing the "Commissioner of Patents, Washington, D. C."